United States Patent
Zhang (10) Patent No.: US 10,726,758 B2
(45) Date of Patent: Jul. 28, 2020

(54) DISPLAY PANEL

(71) Applicant: WUHAN CHINA STAR OPTOELECTRONICS SEMICONDUCTOR DISPLAY TECHNOLOGY CO., LTD., Wuhan, Hubei (CN)

(72) Inventor: Xiaoxia Zhang, Hubei (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 16/342,546

(22) PCT Filed: Mar. 18, 2019

(86) PCT No.: PCT/CN2019/078548
§ 371 (c)(1),
(2) Date: Apr. 17, 2019

(65) Prior Publication Data
US 2020/0175904 A1 Jun. 4, 2020

(30) Foreign Application Priority Data
Dec. 4, 2018 (CN) .......................... 2018 1 1474755

(51) Int. Cl.
*G09G 3/20* (2006.01)
*G09F 9/30* (2006.01)
*G06F 1/16* (2006.01)

(52) U.S. Cl.
CPC ................. *G09G 3/20* (2013.01); *G09F 9/30* (2013.01); *G06F 1/1601* (2013.01); *G09G 2300/0426* (2013.01)

(58) Field of Classification Search
CPC .... G09G 3/20; G09G 2300/0426; G09F 9/30; G06F 1/1601; G02F 1/136286; G02F 2001/13629
USPC .......................................................... 174/254
See application file for complete search history.

(56) References Cited

U.S. PATENT DOCUMENTS

| 2018/0308912 A1 | 10/2018 | Kim et al. | |
| 2019/0051670 A1 | 2/2019 | Bei et al. | |
| 2019/0079625 A1* | 3/2019 | Wang | G06F 3/0412 |
| 2019/0107761 A1* | 4/2019 | Yasuda | G02F 1/136286 |
| 2019/0121211 A1* | 4/2019 | Luo | G09G 3/3208 |
| 2019/0164489 A1* | 5/2019 | Zhang | G09G 3/3258 |

(Continued)

FOREIGN PATENT DOCUMENTS

| CN | 105990332 A | 10/2016 |
| CN | 106782270 A | 5/2017 |

(Continued)

*Primary Examiner* — Sherman Ng
(74) *Attorney, Agent, or Firm* — Mark M. Friedman (57) ABSTRACT

A display panel is provided, including: a display area, where an edge of the display area is formed with a notch; a hole formed in an area surrounded by an outline of the notch; a non-display area disposed between the display area and the hole; and a first trace and a second trace disposed on the non-display area, where the second trace is adjacent to and electrically isolated from the first trace. The first trace and the second trace extend from one side of the non-display area to an opposite side, and include serpentine bending sections around the hole. The first trace and the second trace are located on different layers.

9 Claims, 11 Drawing Sheets

(56) References Cited

U.S. PATENT DOCUMENTS

2019/0235334 A1* 8/2019 Wu .................. G02F 1/136286
2019/0245029 A1  8/2019 Ka et al.

FOREIGN PATENT DOCUMENTS

| CN | 107293567 A | 10/2017 |
| CN | 107331295 A | 11/2017 |
| CN | 107966864 A | 4/2018 |
| CN | 107993581 A | 5/2018 |
| CN | 108646492 A | 10/2018 |
| CN | 108807426 A | 11/2018 |

* cited by examiner

FIG. 1

(PRIOR ART)

FIG. 2

(PRIOR ART)

DISPLAY PANEL

FIELD OF DISCLOSURE

The present disclosure relates to display panels, and more particularly to a display panel having a hole formed in a display area.

BACKGROUND

Nowadays, full-screen mobile phones are increasingly favored by people. How to improve a screen-to-body ratio of a display panel has become a popular research of the display panel. In order to maximize the screen-to-body ratio, the screen-to-body ratio of the display panel can be increased from two aspects: one is a reduced border, and the other is a special-shaped design, that is, the display area adopts a special design (non-rectangular) with a notch.

Figure 1:
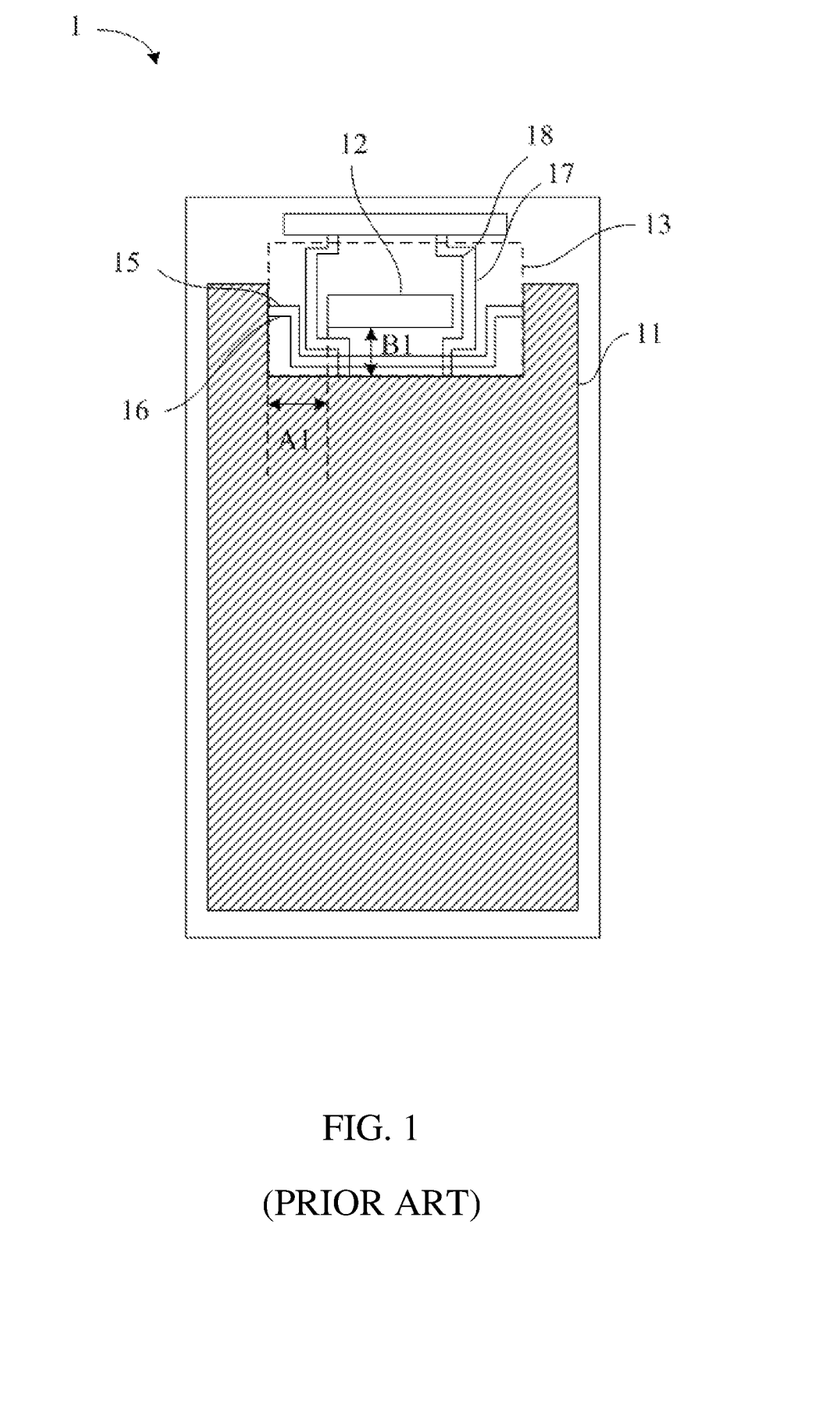
FIG. 1 shows a schematic structural diagram of a special-shaped display panel in the prior art.
Figure 2:
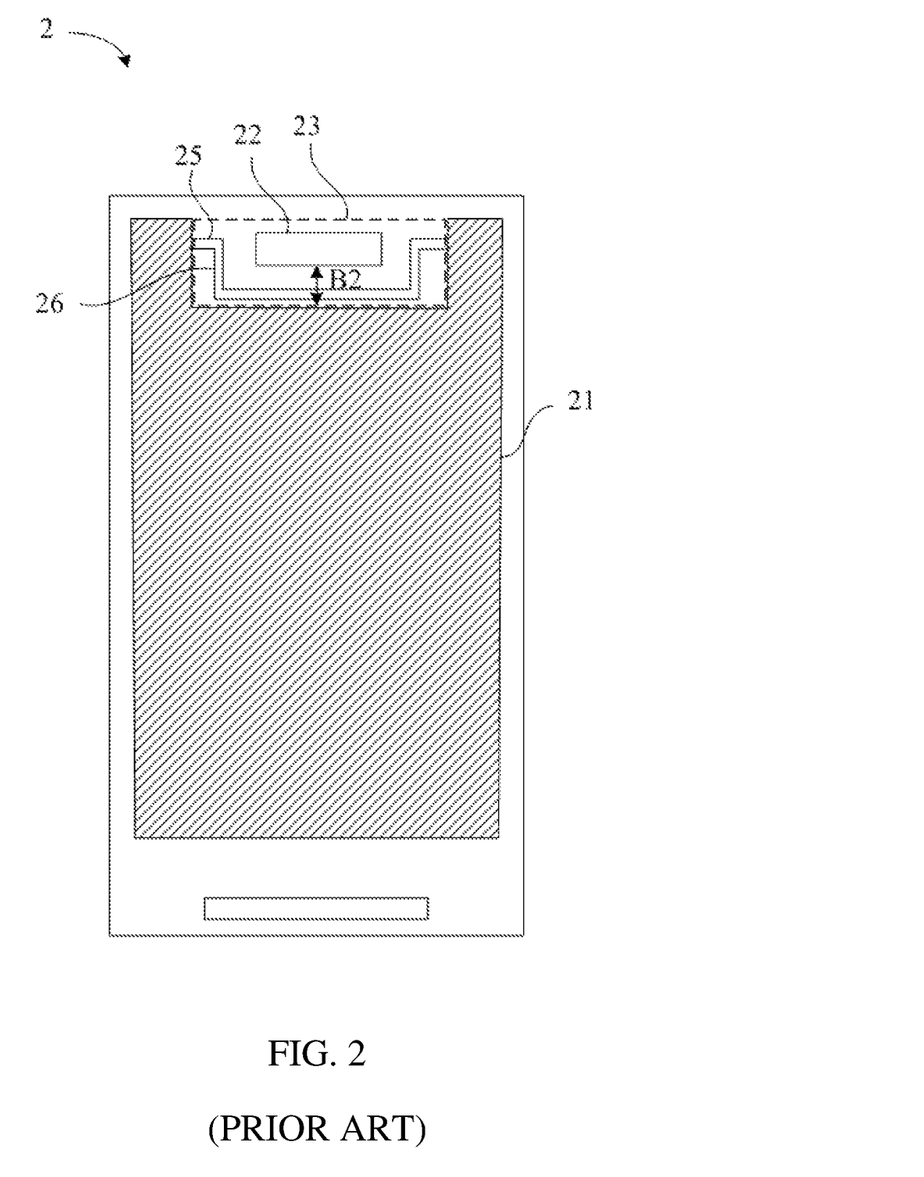
FIG. 2 shows a schematic structural diagram of another special-shaped display panel in the prior art.

Referring to FIG. 1 and FIG. 2, which show schematic structural diagrams of two special-shaped display panels in the prior art. As shown in FIG. 1, a display panel 1 includes a display area 11, a hole 12, a non-display area 13, a pair of gate lines 15 and 16, and a pair of data lines 17 and 18. The display area 11 adopts a special-shaped (non-rectangular) design for providing a setting of the hole 12, where the hole 12 is a reserved area for devices such as a camera, and the gate lines 15 and 16 and the data line 17 and 18, etc. are required to be distributed around this area. Also, pixels cannot be provided properly in an area (i.e., the non-display area 13) where the gate lines 15 and 16 and the data line 17 and 18 are provided around the hole 12. Similarly, as shown in FIG. 2, a display panel 2 includes a display area 21, a hole 22, a non-display area 23, and a pair of gate lines 25 and 26, where pixels cannot be provided properly in the non-display area 23.

Therefore, the screen-to-body ratio of the display panel is influenced by size of the hole, and is also influenced by size of a space occupied by the display area. Therefore, for the special-shaped display panel, reducing the space occupied by signal lines (i.e., the non-display area) is one of directions for increasing the screen-to-body ratio of the display panel.

Accordingly, it is necessary to provide a display panel to solve the technical problems in the prior art.

SUMMARY OF DISCLOSURE

In order to solve technical problems mentioned above, an object of the present disclosure is to provide a display panel, which can reduce a space occupied by signal lines and increase a screen-to-body ratio of the display panel.

In order to achieve the object described above, the present disclosure provides a display panel, including: a display area, where an edge of the display area is formed with a notch; a hole formed in an area surrounded by an outline of the notch; a non-display area disposed between the display area and the hole; a first trace and a second trace disposed on the non-display area, where the second trace is adjacent to and electrically isolated from the first trace; a source driver chip adjacent to the non-display area, where the hole is located between the display area and the source driver chip, and the first trace and the second trace are connected to the source driver chip and the display area; a third trace and a fourth trace disposed on the non-display area, where the third trace is adjacent to and electrically isolated from the fourth trace, and the third trace connects a gate line in the same row of the display area, and the fourth trace connects another gate line in another row of the display area; and where the first trace and the second trace extend from one side of the non-display area to an opposite side, and include serpentine bending sections around the hole; and where the first trace and the second trace are located on different layers, and the third trace and the fourth trace are located on the same layer, and a transverse distance between the first trace and the second trace is less than a transverse distance between the third trace and the fourth trace.

In one preferred embodiment of the present disclosure, the first trace connects a first pin of the source driver chip and a first data line of the display area, and the second trace connects a second pin of the source driver chip and a second data line of the display area.

The present disclosure also provides a display panel, including: a display area, where an edge of the display area is formed with a notch; a hole formed in an area surrounded by an outline of the notch; a non-display area disposed between the display area and the hole; and a first trace and a second trace disposed on the non-display area, where the second trace is adjacent to and electrically isolated from the first trace; where the first trace and the second trace extend from one side of the non-display area to an opposite side, and include serpentine bending sections around the hole; and where the first trace and the second trace are located on different layers.

In one preferred embodiment of the present disclosure, the display panel further includes a source driver chip adjacent to the non-display area, where the hole is located between the display area and the source driver chip, and the first trace and the second trace are connected to the source driver chip and the display area.

In one preferred embodiment of the present disclosure, the first trace connects a first pin of the source driver chip and a first data line of the display area, and the second trace connects a second pin of the source driver chip and a second data line of the display area.

In one preferred embodiment of the present disclosure, the display panel further includes a third trace and a fourth trace disposed on the non-display area, where the third trace is adjacent to and electrically isolated from the fourth trace, and the third trace connects a gate line in the same row of the display area, and the fourth trace connects another gate line in another row of the display area.

In one preferred embodiment of the present disclosure, the third trace and the fourth trace are located on the same layer, and a transverse distance between the first trace and the second trace is less than a transverse distance between the third trace and the fourth trace.

In one preferred embodiment of the present disclosure, the display panel further includes a source driver chip adjacent to the non-display area, where the hole is located between the display area and the source driver chip, and the first trace connects a gate line in the same row of the display area, and the second trace connects another gate line in another row of the display area.

In one preferred embodiment of the present disclosure, the display panel further includes a third trace and a fourth trace disposed on the non-display area, where the third trace is adjacent to and electrically isolated from the fourth trace, and the third trace and the fourth trace connect the source driver chip and the display area.

In one preferred embodiment of the present disclosure, the third trace and the fourth trace are located on the same layer, and a transverse distance between the first trace and the second trace is less than a transverse distance between the third trace and the fourth trace.

In one preferred embodiment of the present disclosure, the display panel further includes a source driver chip adjacent to the display area, where the display area is located between the hole and the source driver chip, and the source driver chip and the hole are located on two opposite sides of the display panel.

In one preferred embodiment of the present disclosure, the first trace connects a gate line in the same row of the display area, and the second trace connects another gate line in another row of the display area.

In comparison to prior art, in the present disclosure, the present disclosure reduces a distance between a display area and a hole by using data lines formed on two layers or gate lines formed on two layers, thereby increasing the display area. In a manufacturing process, a distance between metal wires on the same layer must be large enough to reduce a risk of short circuit. In contrast, a distance between metal wires on different layers is relatively small. For example, the distance between the two metal wires on the different layers can be reduced by more than 50% compared with the distance between the two metal wires on the same layer. When a notch of the display area is on the same side as a source driver chip, data lines and gate lines need to be set around the hole. A distance between the display area and the hole can be reduced by data lines formed on two layers or gate lines formed on two layers. As a result, the display area is increased and a screen-to-body ratio is increased. When the notch of the display area and the source driver chip are on two opposite sides, the gate lines need to be set around the hole. By using the two-layer gate line, a distance from the display area to the hole can be reduced, thereby increasing the display area and increasing the screen-to-body ratio.

DETAILED DESCRIPTION

The structure and the technical means adopted by the present disclosure to achieve the above and other objects can be best understood by referring to the following detailed description of the preferred embodiments and the accompanying drawings.

Figure 3:
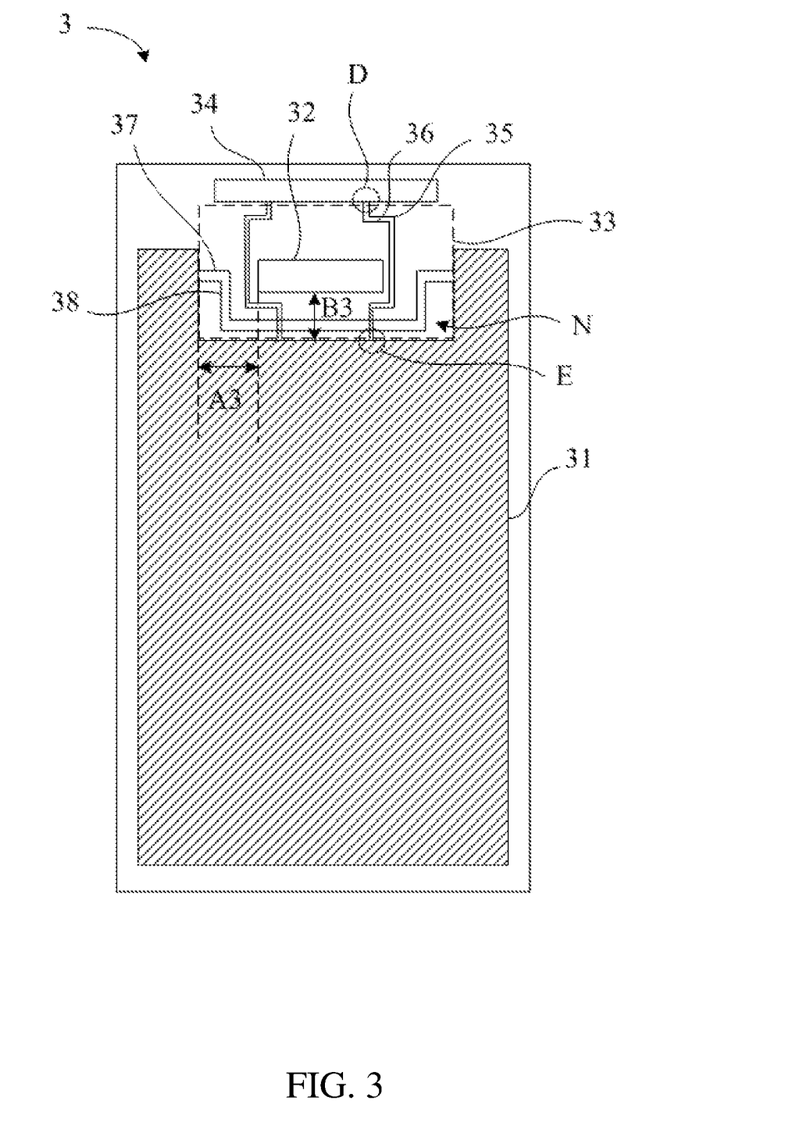
FIG. 3 shows a schematic structural diagram of a display panel according to a first preferred embodiment of the present disclosure.

Referring to FIG. 3, which shows a schematic structural diagram of a display panel 3 according to a first preferred embodiment of the present disclosure. The display panel 3 includes a display area 31, a hole 32, a non-display area 33, a source driver chip 34, a first trace 35, a second trace 36, a third trace 37, and a fourth trace 38. The display area 31 adopts a special-shaped (non-rectangular) design for provision of the hole 32. Specifically, an edge of the display area 31 is formed with a notch N, and the hole 32 is formed in an area surrounded by an outline of the notch N. The hole 32 is reserved for devices, such as camera, and so on. The non-display area 33 is located between the display area 31 and the hole 32. The first trace 35, the second trace 36, the third trace 37, and the fourth trace 38 are disposed in the non-display area 33, and the traces are arranged around the hole 32. Specifically, the first trace 35, the second trace 36, the third trace 37, and the fourth trace 38 extend from one side of the non-display area 33 to an opposite side, and each trace includes a serpentine bending section formed around the hole 32. That is, the non-display area 33 is an area of provision of setting of the traces.

Figure 4:
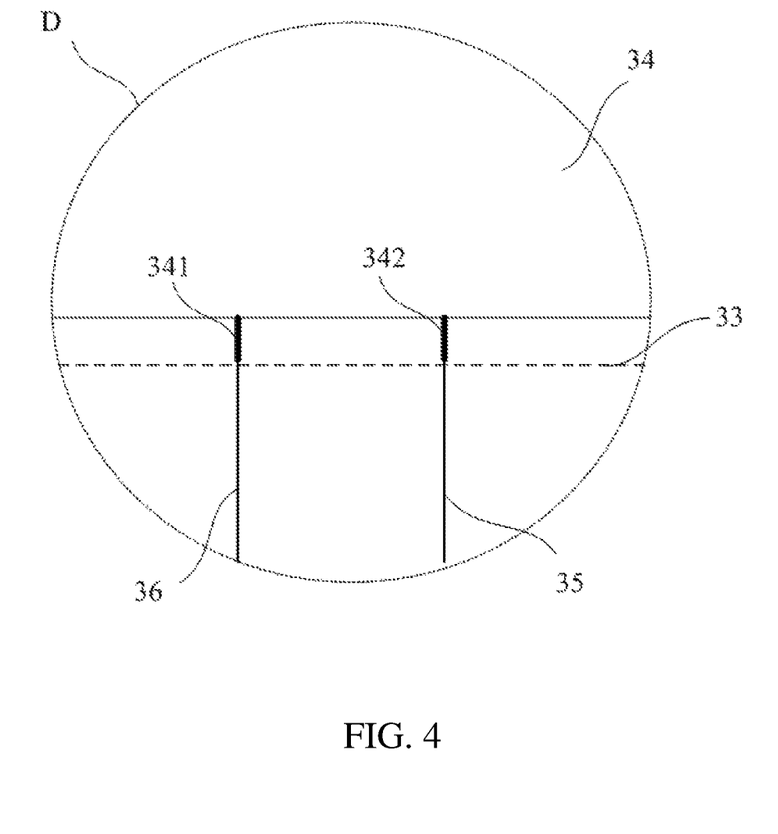
FIG. 4 shows an enlarged schematic view of a portion D of FIG. 3.
Figure 5:
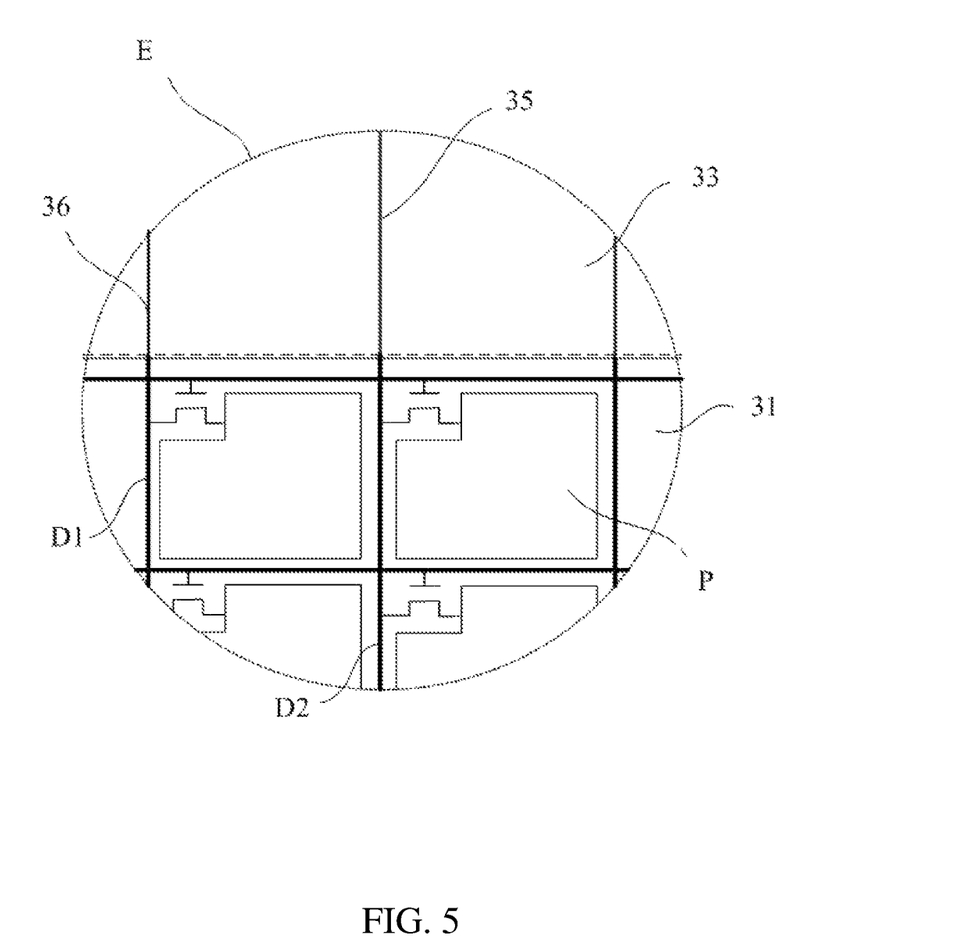
FIG. 5 shows an enlarged schematic view of a portion E of FIG. 3.

As shown in FIG. 3, the source driver chip 34 is adjacent to the non-display area 33, and the hole 32 is located between the display area 31 and the source driver chip 34. The first trace 35 and the second trace 36 connect to the source driver chip 34 and the display area 31. Specifically, referring to FIG. 4 and FIG. 5, where FIG. 4 shows an enlarged schematic view of a portion D of FIG. 3, and FIG. 5 shows an enlarged schematic view of a portion E of FIG. 3. The display area 31 is provided with a plurality of pixel units P arranged in an array, and there in no pixel units P in the non-display area 33. The first trace 35 is connected to a first pin 341 of the source driver chip 34 and a first data line D1 of the display area 31. The second trace 36 is connected to a second pin 342 of the source driver chip 34 and the second data line D2 of the display area 31.

As shown in FIG. 3, the third trace 37 connects a gate line in the same row of the display area 31, and the fourth trace 38 connects another gate line in another row of the display area 31.

Figure 6:
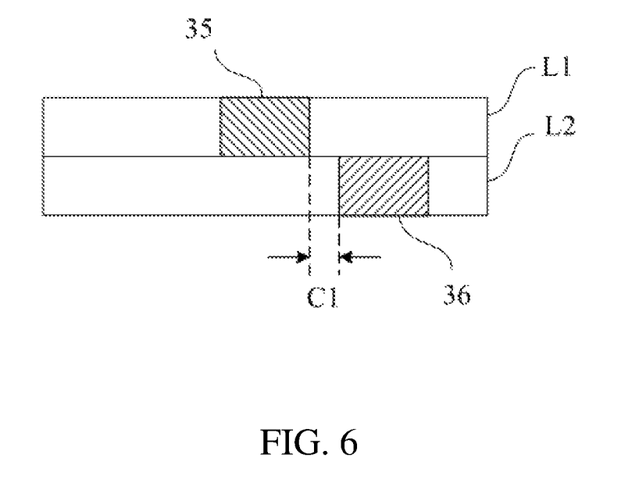
FIG. 6 shows a partial cross-sectional view of FIG. 3.
Figure 7:
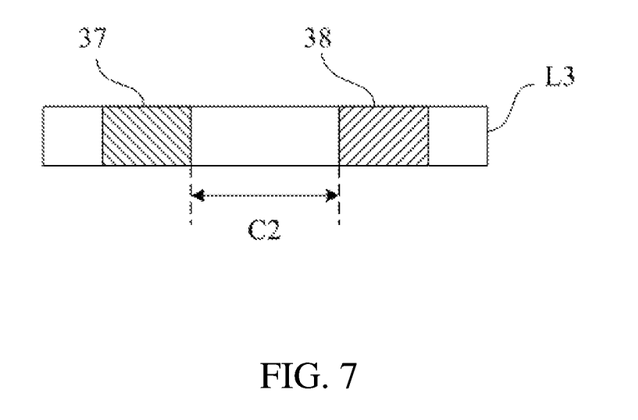
FIG. 7 shows another partial cross-sectional view of FIG. 3.

Referring to FIG. 6 and FIG. 7, where FIG. 6 shows a partial cross-sectional view of FIG. 3, and FIG. 7 shows another partial cross-sectional view of FIG. 3. It should be noted that FIG. 6 and FIG. 7 only show layers in which the first trace 35, the second trace 36, the third trace 37, and the fourth trace 38 are located, and remaining layer structures are omitted. As shown in FIG. 6, the first trace 35 and the second trace 36 are adjacent and electrically isolated, and the first trace 35 and the second trace 36 are located on different layers, that is, the first trace 35 is located on a first layer L1, and the second trace 36 is located on a second layer L2. The first trace 35 and the second trace 36 are separated from each other by a transverse distance C1. As shown in FIG. 7, the third trace 37 and the fourth trace 38 are adjacent and electrically isolated, and the third trace 37 and the fourth trace 38 are located on the same layer, that is, the third trace 37 and the fourth trace 38 are located on a layer L3, where the third trace 37 and fourth trace 38 are separated from each other by a transverse distance C2. In a manufacturing process, a distance between metal wires on the same layer must be large enough to reduce a risk of short circuit. In contrast, a distance between metal wires on the different layers is relatively small. For example, the distance between the two metal wires on the different layers can be reduced by more than 50% compared with the distance between the two metal wires on the same layer. Therefore, the transverse distance C1 of the first trace 35 and the second trace 36 is less than the transverse distance C2 of the third trace 37 and the fourth trace 38. In the present disclosure, by setting the first trace 35 and the second trace 36 on different layers, a size of the non-display area 33 can be effectively reduced, thereby increasing an area of the display area 31 and increasing a screen-to-body ratio. Specifically, in comparison with the display panel 1 of the prior art (as shown in FIG. 1), a distance A3 between the display area 31 and one side of the hole 32 or a distance B3 between the display area 31 and the other side of the hole 32 can be effectively reduced, where a reduction of the distance A3 is larger. Alternatively, in another embodiment, the third trace 37 and the fourth trace 38 may be designed to be located on different layers, so that the size of the non-display area 33 can be more effectively reduced, thereby increasing an area of the display area 31, and increasing the screen-to-body ratio.

Figure 8:
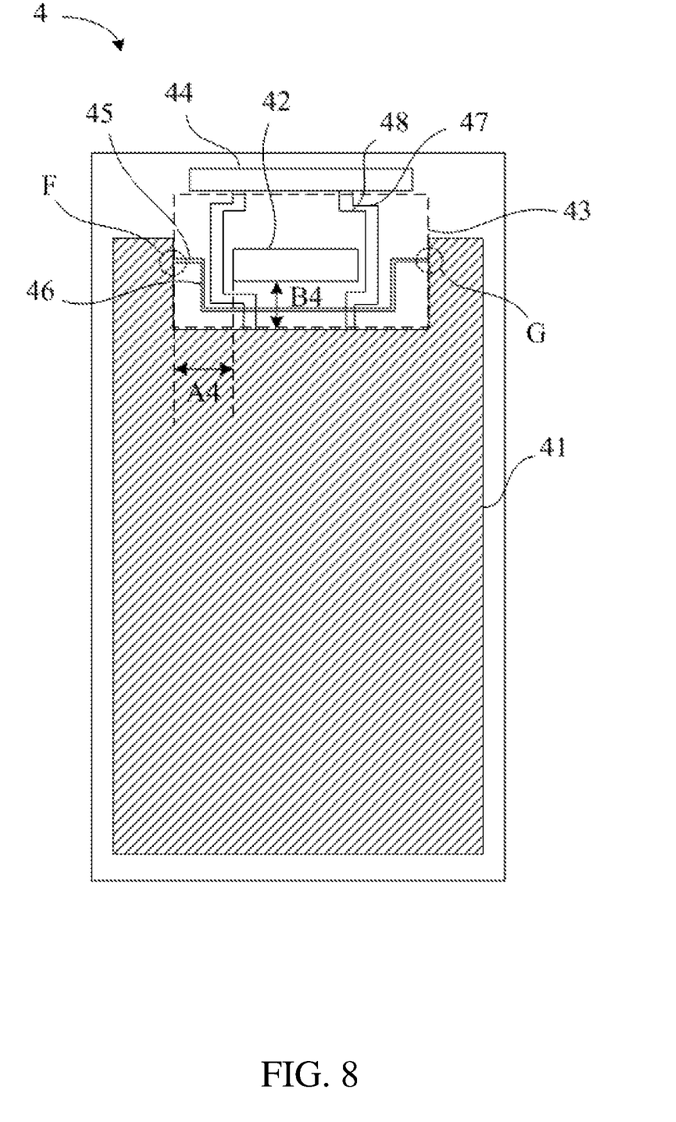
FIG. 8 shows a schematic structural diagram of a display panel according to a second preferred embodiment of the present disclosure.

Referring to FIG. 8, which shows a schematic structural diagram of a display panel 4 according to a second preferred embodiment of the present disclosure. The display panel 4 includes a display area 41, a hole 42, a non-display area 43, a source driver chip 44, a first trace 45, a second trace 46, a third trace 47, and a fourth trace 48, where the display panel 4 of the second embodiment has a structure substantially the same as that the display panel 3 of the first embodiment, and the same part will not be described here.

Figure 9:
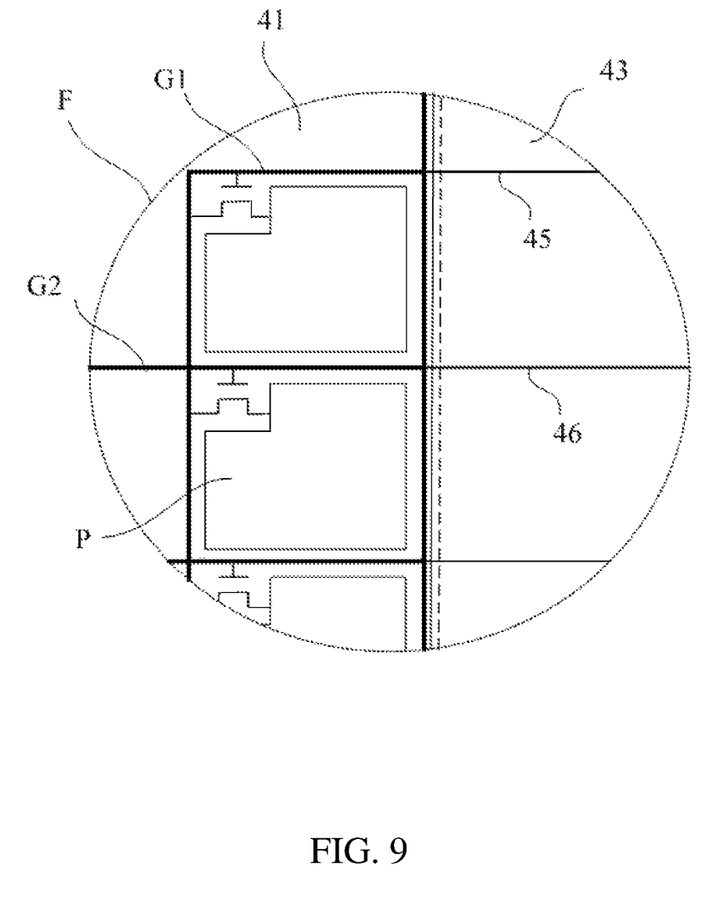
FIG. 9 shows an enlarged schematic view of a portion F of FIG. 8.
Figure 10:
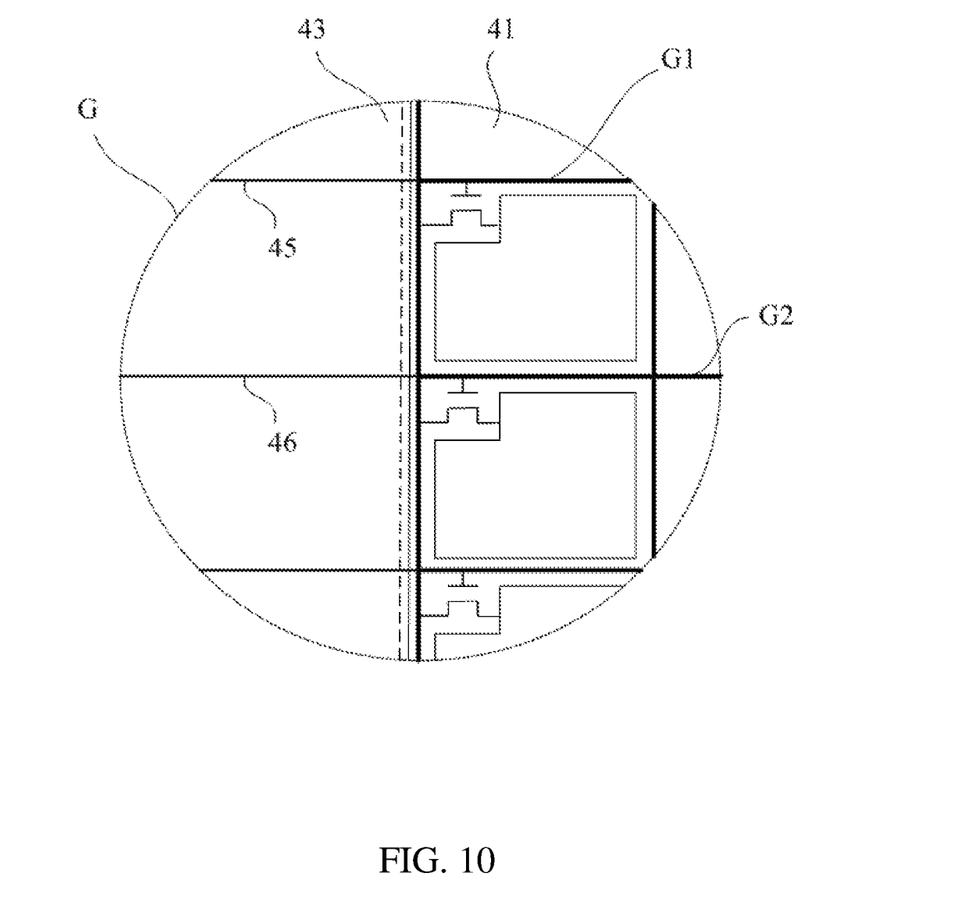
FIG. 10 shows an enlarged schematic view of a portion G of FIG. 8.

As shown in FIG. 8, the source driver chip 44 is adjacent to the non-display area 43, and the hole 42 is located between the display area 41 and the source driver chip 44. The first trace 45 and the second trace 46 connect a gate line in the same row of the display row 41. Specifically, referring to FIG. 9 and FIG. 10, where FIG. 9 shows an enlarged schematic view of a portion F of FIG. 8, and FIG. 10 shows an enlarged schematic view of a portion G of FIG. 8. The display area 41 is provided with a plurality of pixel units P arranged in an array, and there is no pixel units P in the non-display area 43. The first trace 45 connects a first gate line G1 of the display area 41 in the same row, and the second trace 46 connects a second gate line G2 of the display area 41 in a second row, where the first gate line G1 and the second gate line G2 are adjacent to each other.

Moreover, as shown in FIG. 8, the third trace 47 and the fourth trace 48 are connected to the source driver chip 44 and the display area 41.

Figure 11:
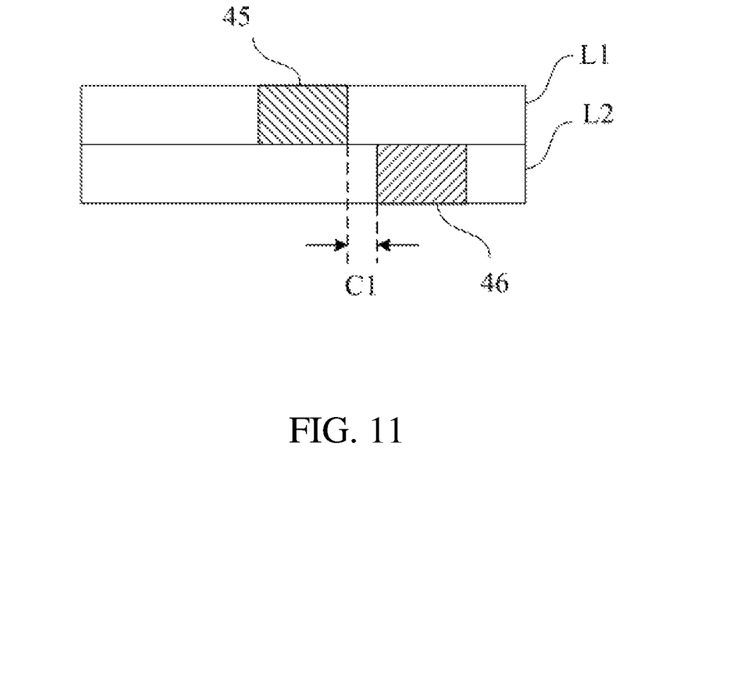
FIG. 11 shows a partial cross-sectional view of FIG. 8.
Figure 12:
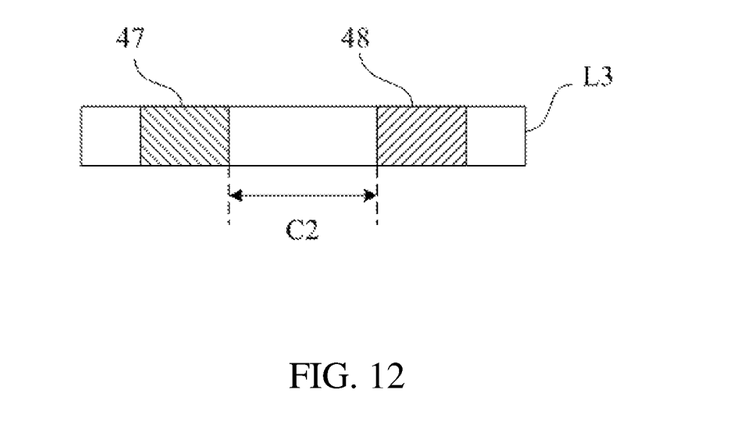
FIG. 12 shows another partial cross-sectional view of FIG. 8.

Referring to FIG. 11 and FIG. 12, where FIG. 11 shows a partial cross-sectional view of FIG. 8, and FIG. 12 shows another partial cross-sectional view of FIG. 8. It should be noted that FIGS. 11 and 12 only show layers in which the first trace 45, the second trace 46, the third trace 47, and the fourth trace 48 are located, and remaining layer structures are omitted. As shown in FIG. 11, the first trace 45 and the second trace 46 are adjacent and electrically isolated, and the first trace 45 and the second trace 46 are located on different layers, that is, the first trace 45 is located on a first layer L1, and the second trace 46 is located on a second layer L2. The first trace 45 and the second trace 46 are separated from each other by a transverse distance C1. As shown in FIG. 12, the third trace 47 and the fourth trace 48 are adjacent and electrically isolated, and the third trace 47 and the fourth trace 48 are located on the same layer, that is, the third trace 47 and the fourth trace 48 are located on a layer L3, where the third trace 47 and fourth trace 48 are separated from each other by a transverse distance C2. In a manufacturing process, a distance between metal wires on the same layer must be large enough to reduce a risk of short circuit. In contrast, a distance between metal wires on different layers is relatively small. For example, the distance between the two metal wires on the different layers can be reduced by more than 50% compared with the distance between the two metal wires on the same layer. Therefore, the transverse distance C1 of the first trace 45 and the second trace 46 is less than the transverse distance C2 of the third trace 47 and the fourth trace 48. In the present disclosure, by setting the first trace 45 and the second trace 46 on different layers, a size of the non-display area 43 can be effectively reduced, thereby increasing an area of the display area 41 and increasing a screen-to-body ratio. Specifically, in comparison with the display panel 1 of the prior art (as shown in FIG. 1), a distance A4 between the display area 41 and one side of the hole 42 or a distance B4 between the display area 41 and the other side of the hole 42 can be effectively reduced, where a reduction of the distance A4 is larger. Alternatively, in another embodiment, the third trace 47 and the fourth trace 48 may be designed to be located on different layers, so that the size of the non-display area 43 can be more effectively reduced, thereby increasing an area of the display area 41, and increasing the screen-to-body ratio.

Figure 13:
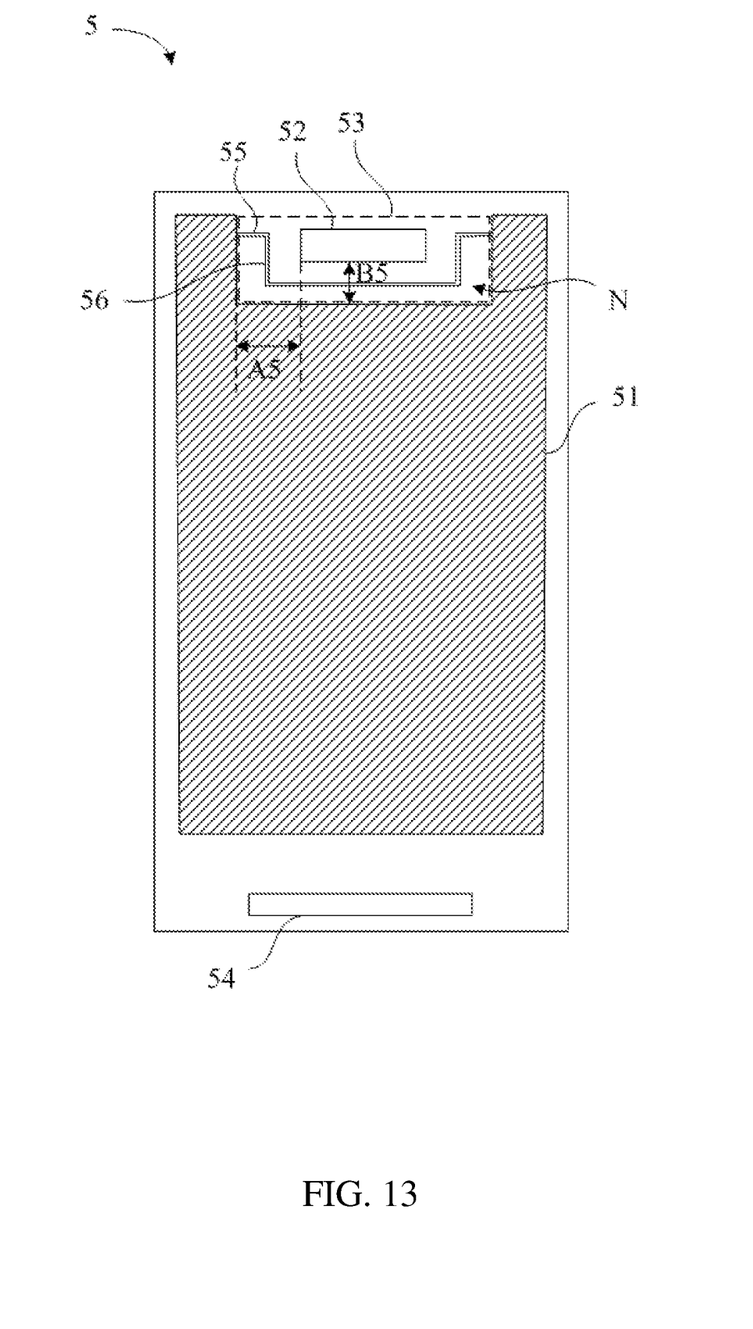
FIG. 13 shows a schematic structural diagram of a display panel according to a third preferred embodiment of the present disclosure.

Referring to FIG. 13, which shows a schematic structural diagram of a display panel 5 according to a third preferred embodiment of the present disclosure. The display panel 5 includes a display area 51, a hole 52, a non-display area 53, a source driver chip 54, a first trace 55, and a second trace 56. The display area 51 adopts a special-shaped (non-rectangular) design for provision of the hole 52. Specifically, an edge of the display area 51 is formed with a notch N, and the hole 52 is formed in an area surrounded by an outline of the notch N. The hole 52 is reserved for devices, such as camera, and so on. The non-display area 53 is located between the display area 51 and the hole 52. The first trace 55 and the second trace 56 are disposed in the non-display area 33, and the traces are arranged around the hole 52. Specifically, the first trace 55 and the second trace 56 extend from one side of the non-display area 53 to an opposite side, and each trace includes a serpentine bending section formed around the hole 52. That is, the non-display area 53 is an area of provision of setting of the traces.

As shown in FIG. 13, the source driver chip 54 is adjacent to the display area 51, and the display area 51 is located between the hole 52 and the source driver chip 54, and the source driver chip 54 and the hole 52 are located on two opposite sides of the display panel 5. The first trace 55 and the second trace 56 connect the gate lines in the same row of the display area 51. Specifically, the first trace 55 connects a first gate line in the same row of the display area 51, and the second trace 56 connects a second gate line in a second row the display area 51, where the first gate line and the second gate line are adjacent to each other.

As shown in FIG. 13, the first trace 55 and the second trace 56 are adjacent and electrically isolated, and the first trace 55 and the second trace 56 are located on different layers (which is similar to the first trace 45 and the second trace 46 of the second embodiment). In a manufacturing process, a distance between metal wires on the same layer must be large enough to reduce a risk of short circuit. In contrast, a distance between metal wires on the different layers is relatively small. For example, the distance between the two metal wires on the different layers can be reduced by more than 50% compared with the distance between the two metal wires on the same layer. In the present disclosure, by setting the first trace 55 and the second trace 56 on different layers, a size of the non-display area 53 can be effectively reduced, thereby increasing an area of the display area 51 and increasing a screen-to-body ratio. Specifically, in comparison with the display panel 2 of the prior art (as shown in FIG. 2), a distance A5 between the display area 51 and one side of the hole 52 or a distance B5 between the display area 51 and the other side of the hole 52 can be effectively reduced, where a reduction of the distance A5 is larger.

In summary, in the present disclosure, the present disclosure reduces a distance between a display area and a hole by using data lines formed on two layers or gate lines formed on two layers, thereby increasing the display area. In a manufacturing process, a distance between metal wires on the same layer must be large enough to reduce a risk of short circuit. In contrast, a distance between metal wires on different layers is relatively small. For example, the distance between the two metal wires on the different layers can be reduced by more than 50% compared with the distance between the two metal wires on the same layer. When a notch of the display area is on the same side as a source driver chip, data lines and gate lines need to be set around the hole. A distance between the display area and the hole can be reduced by data lines formed on two layers or gate lines formed on two layers. As a result, the display area is increased and a screen-to-body ratio is increased. When the notch of the display area and the source driver chip are on two opposite sides, the gate lines need to be set around the hole. By using the two-layer gate line, a distance from the display area to the hole can be reduced, thereby increasing the display area and increasing the screen-to-body ratio.

The above descriptions are merely preferable embodiments of the present disclosure. Any modification or replacement made by those skilled in the art without departing from the principle of the present disclosure should fall within the protection scope of the present disclosure.

What is claimed is:

1. A display panel, comprising:
a display area, wherein an edge of the display area is formed with a notch;
a hole formed in an area surrounded by an outline of the notch;
a non-display area disposed between the display area and the hole;
a first trace and a second trace disposed on the non-display area, wherein the second trace is adjacent to and electrically isolated from the first trace;
a source driver chip adjacent to the non-display area, wherein the hole is located between the display area and the source driver chip, and the first trace and the second trace are connected to the source driver chip and the display area;
a third trace and a fourth trace disposed on the non-display area, wherein the third trace is adjacent to and electrically isolated from the fourth trace, and the third trace connects a gate line in the same row of the display area, and the fourth trace connects another gate line in another row of the display area; and
wherein the first trace and the second trace extend from one side of the non-display area to an opposite side, and comprise serpentine bending sections around the hole; and
wherein the first trace and the second trace are located on different layers, and the third trace and the fourth trace are located on the same layer, and a transverse distance between the first trace and the second trace is less than a transverse distance between the third trace and the fourth trace.

2. The display panel as claimed in claim 1, wherein the first trace connects a first pin of the source driver chip and a first data line of the display area, and the second trace connects a second pin of the source driver chip and a second data line of the display area.

3. A display panel, comprising:
a display area, wherein an edge of the display area is formed with a notch;
a hole formed in an area surrounded by an outline of the notch;
a non-display area disposed between the display area and the hole;
a source driver chip adjacent to the non-display area; and
a first trace and a second trace disposed on the non-display area, wherein the second trace is adjacent to and electrically isolated from the first trace;
wherein the first trace and the second trace extend from one side of the non-display area to an opposite side, and comprise serpentine bending sections around the hole;
wherein the first trace and the second trace are located on different layers; and
wherein the hole is located between the display area and the source driver chip, and the first trace and the second trace are connected to the source driver chip and the display area.

4. The display panel as claimed in claim 3, wherein the first trace connects a first pin of the source driver chip and a first data line of the display area, and the second trace connects a second pin of the source driver chip and a second data line of the display area.

5. The display panel as claimed in claim 3, wherein the display panel further comprises a third trace and a fourth trace disposed on the non-display area, wherein the third trace is adjacent to and electrically isolated from the fourth trace, and the third trace connects a gate line in the same row of the display area, and the fourth trace connects another gate line in another row of the display area.

6. The display panel as claimed in claim 5, wherein the third trace and the fourth trace are located on the same layer, and a transverse distance between the first trace and the second trace is less than a transverse distance between the third trace and the fourth trace.

7. A display panel, comprising:
a display area, wherein an edge of the display area is formed with a notch;
a hole formed in an area surrounded by an outline of the notch;
a non-display area disposed between the display area and the hole;
a first trace and a second trace disposed on the non-display area, wherein the second trace is adjacent to and electrically isolated from the first trace; and
a source driver chip adjacent to the non-display area,
wherein the first trace and the second trace extend from one side of the non-display area to an opposite side, and comprise serpentine bending sections around the hole;
wherein the first trace and the second trace are located on different layers; and
wherein the hole is located between the display area and the source driver chip, and the first trace connects a gate line in the same row of the display area, and the second trace connects another gate line in another row of the display area.

8. The display panel as claimed in claim 7, wherein the display panel further comprises a third trace and a fourth trace disposed on the non-display area, wherein the third trace is adjacent to and electrically isolated from the fourth trace, and the third trace and the fourth trace connect the source driver chip and the display area.

9. The display panel as claimed in claim 8, wherein the third trace and the fourth trace are located on the same layer, and a transverse distance between the first trace and the second trace is less than a transverse distance between the third trace and the fourth trace.

* * * * *